(12) United States Patent
Mannopantar et al.

(10) Patent No.: US 10,739,989 B2
(45) Date of Patent: Aug. 11, 2020

(54) SYSTEM AND METHOD FOR CUSTOMIZING A PRESENTATION

(71) Applicant: Wipro Limited, Bangalore (IN)

(72) Inventors: Raghottam Mannopantar, Bangalore (IN); Raghavendra Hosabettu, Bangalore (IN)

(73) Assignee: Wipro Limited, Bangalore (IN)

( * ) Notice: Subject to any disclaimer, the term of this patent is extended or adjusted under 35 U.S.C. 154(b) by 296 days.

(21) Appl. No.: 15/361,581

(22) Filed: Nov. 28, 2016

(65) Prior Publication Data

US 2018/0095655 A1    Apr. 5, 2018

(30) Foreign Application Priority Data

Oct. 4, 2016 (IN) .............................. 201641033949

(51) Int. Cl.
| | |
|---|---|
| *G06F 3/0488* | (2013.01) |
| *G06F 3/0484* | (2013.01) |
| *G06F 3/16* | (2006.01) |
| *G06F 16/438* | (2019.01) |
| *G06F 16/783* | (2019.01) |
| *G06F 40/117* | (2020.01) |
| *H04L 29/08* | (2006.01) |

(52) U.S. Cl.
CPC ........ *G06F 3/04883* (2013.01); *G06F 3/0484* (2013.01); *G06F 3/165* (2013.01); *G06F 16/4393* (2019.01); *G06F 16/783* (2019.01); *G06F 40/117* (2020.01); *H04L 67/10* (2013.01)

(58) Field of Classification Search
CPC ......... G06F 17/30056; G06F 17/30017; G06F 3/04883; G06F 16/4393; G06F 16/783; G06F 40/117; G06F 3/165; H04L 67/10
See application file for complete search history.

(56) References Cited

U.S. PATENT DOCUMENTS

| | | | |
|---|---|---|---|
| 6,539,163 B1 | 3/2003 | Sheasby et al. | |
| 6,728,753 B1 | 4/2004 | Parasnis et al. | |
| 6,968,506 B2 | 11/2005 | Yacovone et al. | |
| 7,356,763 B2 | 4/2008 | Lin et al. | |
| 8,739,120 B2 | 5/2014 | Moody et al. | |
| 9,020,824 B1 | 4/2015 | Govil | |
| 9,026,915 B1 * | 5/2015 | Ehlen ................ | G06F 17/30056 715/202 |

(Continued)

OTHER PUBLICATIONS

Exteneded European Search Report issued in the European Patent Office in counterpart European Application No. 17152857.3, dated Jul. 21, 2017, 7 pages.

*Primary Examiner* — Angie Badawi
(74) *Attorney, Agent, or Firm* — Finnegan, Henderson, Farabow, Garrett & Dunner, LLP (57) ABSTRACT

A technique is provided for customizing a presentation. The technique includes recording multimedia corresponding to a presenter of a presentation. The recorded multimedia is analyzed to extract a representative information corresponding to the multimedia. Further, one or more pre-recorded multimedia files are determined from a multimedia database. The determination is based on a comparison of the representative information with one or more tags associated with each of a plurality of pre-recorded multimedia files. Subsequently, the presentation is customized by inserting the one or more pre-recorded multimedia in the presentation.

16 Claims, 7 Drawing Sheets

(56) References Cited

U.S. PATENT DOCUMENTS

| | | |
|---|---|---|
| 9,378,740 B1 | 6/2016 | Rosen et al. |
| 2007/0038935 A1* | 2/2007 | Hull ................. G06F 17/30038 715/706 |
| 2007/0130177 A1* | 6/2007 | Schneider ......... G06F 17/30017 |
| 2011/0271194 A1 | 11/2011 | Lin et al. |
| 2012/0194645 A1 | 8/2012 | Fuller et al. |
| 2014/0164507 A1 | 6/2014 | Tesch et al. |
| 2014/0198174 A1 | 7/2014 | Sanso |
| 2015/0082194 A1 | 3/2015 | Rai |
| 2015/0177964 A1 | 6/2015 | Spirer |
| 2015/0288574 A1 | 10/2015 | Sakaki |
| 2017/0085854 A1* | 3/2017 | Furesjo ................. G10L 15/265 |
| 2017/0315676 A1* | 11/2017 | You ......................... G06F 16/35 |

* cited by examiner

FIG. 1: System Environment 100

FIG. 2: Electronic Device 102

FIG. 3A: Exemplary presentation content management user interface

| Presentation Name 304a | | Filter 304m | K1, K5 | | | Search 304n | | |
|---|---|---|---|---|---|---|---|---|
| Segment Listing 304b | | Presentation Text 304c | Filename 304d | Representative Information 304e | | Categorize 304f | Merge 304g | Delete 304h | Insert 304i |
| Slide # | Bullet Point # | | | Domain | Keywords | | | | |
| 1 | 1 | Text Data 1 | A1.wav | Domain 1 | K1, K2 | Normal | ☐ | ☐ | ☐ |
| 1 | 2 | Text Data 2 | A2.wav | Domain 3 | K3, K4 | Normal | ☐ | ☐ | ☐ |
| 2 | 1 | Text Data 3 | V1.avi | Domain 2 | K5 | Optional | ☐ | ☐ | ☐ |

Save 304j     Merge selected segments 304k     Cancel 304l FIG. 3B: Exemplary presentation review user interface FIG. 3C: Exemplary presentation sequencing user interface FIG. 4: Method 400 for customizing a presentation FIG. 5: Example Computer System

SYSTEM AND METHOD FOR CUSTOMIZING A PRESENTATION

TECHNICAL FIELD

This disclosure relates generally to presentations, and more particularly to system and method for customizing a presentation.

BACKGROUND

Presentation is a tool employed by the business organizations in order to make a sales pitch, for training purposes, and/or the like. Microsoft's PowerPoint software is one such tool that is extensively and widely used in the business organizations to prepare the presentations. In order to effectively accomplish the aforementioned purposes, it is imperative to create presentations that effectively disseminate knowledge of the subject matter included in the presentation. This might entail updating the content of the presentation based on various parameters, such as the audience profile, time available for the presentation, etc. Such updates may lead to significant changes in the structure of the presentation compared to the original presentation, over a period of time. Furthermore, in real world scenarios, a presentation may be presented by various distinct presenters, each of which may update the presentation based on individual insights on the subject matter of the presentation.

In certain scenarios, a presenter may desire to access the content of the original presentation. In certain other scenarios, the presenter may intend to customize the presentation using the historical changes made to the presentation by previous presenters of the presentation. Also, a presenter may intend to customize the presentation based on the content presented by a previous presenter, wherein such a content may not be included in the presentation. An example of such a content may include a demo of a product provided by a presenter. Further, in certain other scenarios, the presenter may desire to customize the structure of the presentation based on the various parameters, such as the audience profile, time available for the presentation, etc.

It is therefore desirable to provide a mechanism to track a presentation vis-à-vis the modifications performed to the content of the presentation, as well as the audio or video content, corresponding to the presentation, presented by a presenter. It may be further desired to enable a presenter to customize the presentation, based on such tracking.

SUMMARY

In one embodiment, a method of customizing a presentation is disclosed. In one example, the method comprises recording multimedia corresponding to a presenter presenting the presentation. The method further comprises analyzing the multimedia to extract representative information corresponding to the multimedia. The method further comprises determining one or more pre-recorded multimedia files from a multimedia database. The determination may be based on comparison of the representative information with one or more tags associated with each of a plurality of pre-recorded multimedia files. The method further comprises customizing the presentation by inserting the one or more pre-recorded multimedia files in the presentation.

In another embodiment, a system is disclosed for customizing a presentation is disclosed. The system comprises a processor and a memory communicatively coupled to the processor. The memory stores processor-executable instructions, which, on execution, cause the processor to record multimedia corresponding to a presenter presenting the presentation. The processor-executable instructions, on execution, further cause the processor to analyze the multimedia to extract representative information corresponding to the multimedia. The processor-executable instructions, on execution, further cause the processor to determine one or more pre-recorded multimedia files from a multimedia database. The determination may be based on comparison of the representative information with one or more tags associated with each of a plurality of pre-recorded multimedia files. The processor-executable instructions, on execution, further cause the processor to customize the presentation by inserting the one or more pre-recorded multimedia files in the presentation.

In another embodiment, a non-transitory computer-readable medium storing computer-executable instructions for customizing a presentation is disclosed. In one example, the stored instructions, when executed by a processor, cause the processor to perform operations that comprise to record multimedia corresponding to a presenter presenting the presentation. The operations further comprise analyzing the multimedia to extract representative information corresponding to the multimedia. The operations further comprise determining one or more pre-recorded multimedia files from a multimedia database. The determination may be based on comparison of the representative information with one or more tags associated with each of a plurality of pre-recorded multimedia files. The operations further comprise customizing the presentation by inserting the one or more pre-recorded multimedia files in the presentation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
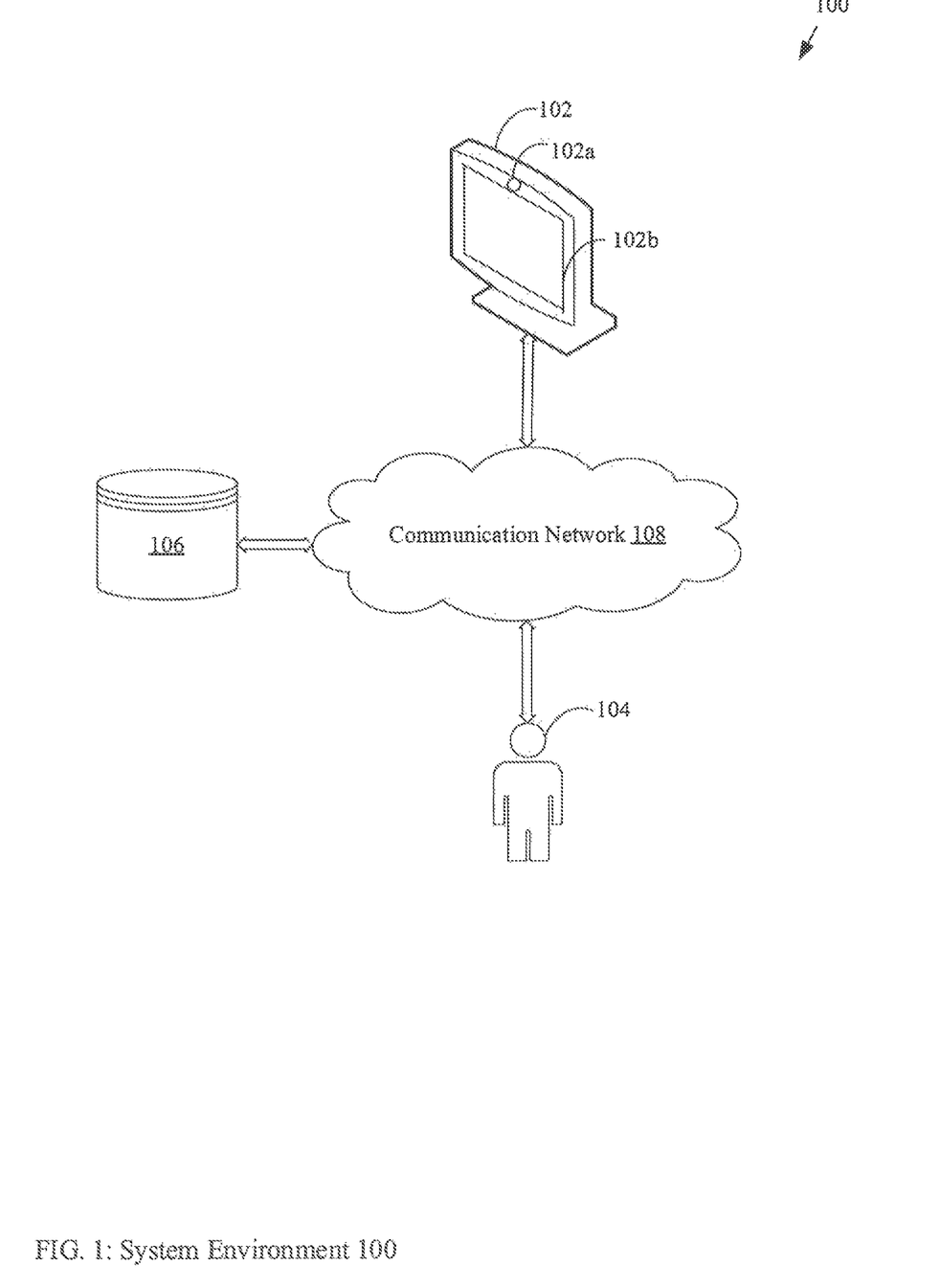
FIG. 1 is a block diagram of an exemplary network environment for customizing a presentation over a communication network, in accordance with some embodiments of the present disclosure.

Referring now to FIG. 1, an exemplary network environment 100 for customizing a presentation is illustrated, in accordance with some embodiments of the present disclosure. As will be described in greater detail in conjunction with FIG. 2, the network environment 100 displays an electronic device 102 comprising recording device 102a and a display screen 102b. The recording device 102a may record multimedia corresponding to a presenter 104 presenting a presentation via the display screen 102b. The electronic device 102 may analyze the recorded multimedia to extract representative information corresponding to the recorded multimedia. The electronic device 102 may further determine one or more pre-recorded multimedia files from a multimedia database 106. The determination may be based on a comparison of the representative information with one or more tags associated with each of a plurality of pre-recorded multimedia files. The electronic device 102 may customize the presentation by inserting the one or more pre-recorded multimedia files in the presentation.

The network environment 100 includes a network of computing devices (e.g., a computer, a server, a digital device, a router, a modem, a bridge, a switch, etc.) for sending or receiving various data. In one embodiment, the network environment 100 includes the electronic device 102 having an associated recording device 102a and a display screen 102b. The electronic device 102 and the multimedia database 106 may be in communication with each other over a wired or wireless communication network 108. Each of the computing devices further includes one or more processors and a computer-readable medium (e.g., a memory). The computer-readable storage medium stores instructions that, when executed by the one or more processors, cause the one or more processors to perform data reception and transmission in accordance with aspects of the present disclosure. The computer-readable storage medium may also store various data (e.g., optimal network path, optimal packet size, data packets, current packet size of a node, etc.) that may be captured, processed, and/or required by the network environment 100.

In operation, the presenter 104 may intend to customize a presentation using the electronic device 102. Such a customization may be initiated based on a multimedia provided by the presenter 104. The customization may be performed on a presentation that is pre-stored in the multimedia database 106. The pre-stored presentation may include a plurality of segments. Furthermore, one or more segments of the presentation may be associated with a pre-recorded multimedia file. Such an association may be historically performed by one or more presenters who have presented the pre-stored presentation.

In an embodiment, the electronic device 102 may include suitable logic, circuitry, interfaces, and/or code for customizing a presentation by use of the recording device 102a and the display screen 102b. The recording device 102a may include a multimedia corresponding to the presenter 104. In accordance with an embodiment, the multimedia may specifically correspond to an audio provided by the presenter 104. A person of ordinary skill in the art will appreciate that the recorded multimedia corresponding to the presenter 104 may further comprise a video recording of the presenter 104. In an implementation, the recording device 102a may be integrated internally into the electronic device 102. In another implementation, the recording device 102a may be external to the electronic device 102 and may be communicatively coupled via the communication network 108.

The recording device 102a may record the multimedia corresponding to the presenter 104. In an embodiment, the recorded multimedia may comprise only an audio provided by the presenter 104. In another embodiment, the recorded multimedia may comprise a video in addition to the audio provided the presenter 104. Such a video may correspond to a demo or a physical illustration provided by a presenter, regarding a subject matter included in the presentation.

The electronic device 102 may be configured to analyze the recorded multimedia to extract a representative information corresponding to the recorded multimedia. In an embodiment, the representative information may include, but is not limited to, at least one or more keywords and a domain of a multimedia.

Based on the analysis of the multimedia, the electronic device 102 may be configured to determine one or more pre-recorded multimedia files from the multimedia database 106. In an embodiment, the multimedia database 106 may include suitable logic, circuitry, interfaces, and/or code for storing the presentations and a plurality of pre-recorded multimedia files corresponding to the presenters who have presented a presentation. The multimedia database 106 may be communicatively coupled to the electronic device 102, via the communication network 108. In accordance with an embodiment, the multimedia database 106 may be implemented by use of various database technologies known in the art. Examples of the multimedia database 106 may include, but are not limited to, Microsoft SQL Server, Oracle®, IBM DB2®, Microsoft Access®, PostgreSQL®, MySQL®, and/or SQLite®. In accordance with an embodiment, the electronic device 102 may connect to the multimedia database 106, based on one or more protocols. Examples of such one or more protocols may include, but are not limited to, Open Database Connectivity (ODBC)® protocol and Java Database Connectivity (JDBC) protocol.

Further, the communication network 108 may include a medium through which the electronic device 102 and the multimedia database 106 present in the network environment 100 may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a telephone line (POTS), Long Term Evolution (LTE), and/or a Metropolitan Area Network (MAN). Various devices in the exemplary network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

In an embodiment, the determination of the one or more pre-recorded multimedia files may be based on a comparison of the recorded representative information with one or more tags associated with each of the plurality of pre-recorded multimedia files. In an embodiment, one or more tags may include, but is not limited to, at least one or more keywords and a domain of a multimedia.

In an embodiment, the electronic device 102 may be further configured to automatically customize the presentation based on insertion of the determined one or more pre-recorded multimedia files in the presentation. The insertion of the determined one or more pre-recorded multimedia files may be further based on determination of one or more segments of the presentation where the insertion is to be performed. In an embodiment, the determination of the one or more segments of the presentation may be determined based on a comparison of the representative information with one or more tags associated with each of the one or more segments of the presentation. Furthermore, in an embodiment, the one or more segments for insertion may be determined based on a machine learning analysis performed on the extracted representative information, the one or more tags associated with each of a plurality of pre-recorded multimedia files, and the one or more tags associated with each of the one or more segments of the presentation.

In another embodiment, the electronic device 102 may be configured to recommend the determined pre-recorded multimedia files for insertion into one or more segments of the presentation, to the presenter 104. The determined recommendations may be based on the comparison of the representative information with the one or more tags associated with each of the plurality of pre-recorded multimedia files. In another embodiment, the determined recommendations may be further based on the one or more tags associated with the one or more segments of the presentation. The electronic device 102 may be configured to render the determined recommendation to the presenter 104, via the display screen 102b. The display screen 102b may be realized through several known technologies that may include, but are not limited to, a Liquid Crystal Display (LCD) display, a Light Emitting Diode (LED) display, an Organic LED (OLED) display technology, and/or the like. Based on the rendered recommendations, the presenter 104 may provide one or more inputs based on which one or more recommended pre-recorded multimedia may be inserted into the one or more segments of the presentation. In an embodiment, the electronic device 102 may be further configured to store the customized presentation in the multimedia database 106.

In an embodiment, the electronic device 102 may be configured to retrieve a customized presentation of the presenter 104, from the multimedia database 106. The electronic device 102 may further render the retrieved presentation on the display screen 102b, based on one or more gestures of the presenter 104. In an embodiment, the one or more gestures of the presenter 104 may include, but are not limited to, a gesture to play the customized presentation, a gesture to skip one or more segments of the customized presentation, a gesture to start recording of a multimedia associated with the presenter, a gesture to insert one or more multimedia files into one or more segments of the customized presentation, a gesture to delete one or more segments from the customized presentation, a gesture to delete a multimedia from the one or more segments of the presentation.

In an embodiment, the electronic device 104 may be configured to present a user interface on the display screen 102b, to highlight a summary of the customized presentation. The summary may include, but is not limited to, one or more segments and the inserted one or more pre-recorded multimedia file, and a version history of the customized presentation. The user interface may include one or more onscreen objects to display a real-time status of rendering a customized presentation. Furthermore, the electronic device 102 may be further configured to highlight the real-time status based on another onscreen object, such as a marker.

It should be noted that the various modules described above may be implemented in programmable hardware devices such as programmable gate arrays, programmable array logic, programmable logic devices, and so forth. Alternatively, the various modules described above may be implemented in software for execution by various types of processors. An identified module of executable code may, for instance, include one or more physical or logical blocks of computer instructions which may, for instance, be organized as an object, procedure, function, engine, or other construct. Nevertheless, the executables of an identified module need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for transmitting data over a communication network. For example, the exemplary network environment 100 may transmit data over a communication network by the processes discussed herein. In particular, as will be appreciated by those of ordinary skill in the art, control logic and/or automated routines for performing the techniques and steps described herein may be implemented by the network environment 100, either by hardware, software, or combinations of hardware and software. For example, suitable code may be accessed and executed by the one or more processors on the network environment 100 to perform some or all of the techniques described herein. Similarly, application specific integrated circuits (ASICs) configured to perform some or all of the processes described herein may be included in the one or more processors on the network environment 100.

Figure 2:
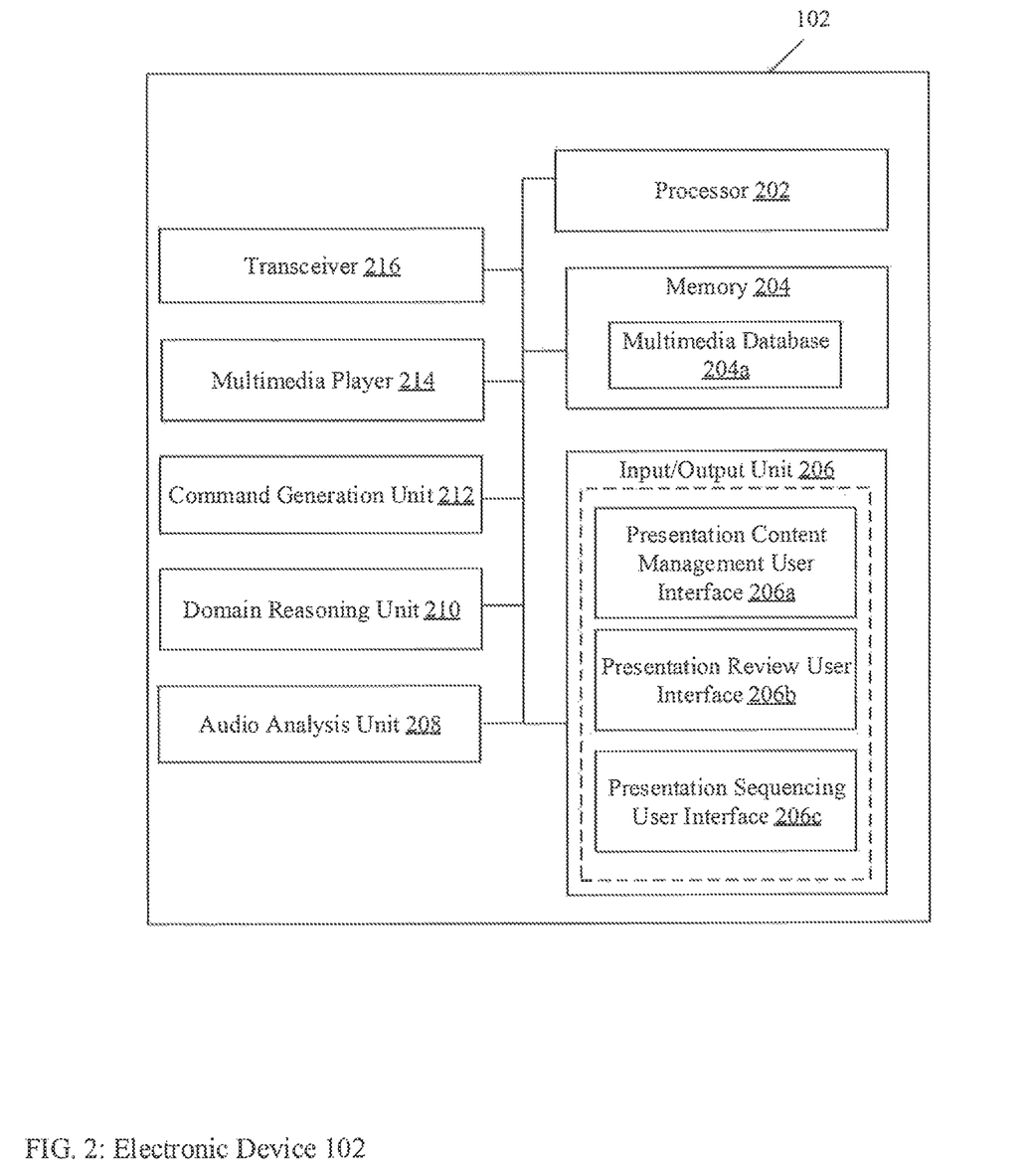
FIG. 2 is a block diagram of exemplary system for customizing a presentation, in accordance with some embodiments of the present disclosure.

FIG. 2 is a block diagram of exemplary system for customizing a presentation, in accordance with some embodiments of the present disclosure. FIG. 2 is explained in conjunction with elements from FIG. 1. With reference to FIG. 2, there is shown the electronic device 102. The electronic device 102 may include one or more processors, such as a processor 202, a memory 204, an input/output (I/O) unit 206, an audio analysis unit 208, a domain reasoning unit 210, a command generation unit 212, a multimedia player 214, and a transceiver 216. The processor 202 may be communicatively coupled to the memory 204, the I/O unit 206, the audio analysis unit 208, the domain reasoning unit 210, the command generation unit 212, the multimedia player 214, and the transceiver 216. In an embodiment, the electronic device 102 may be communicatively coupled to the one or more remote devices, such as the multimedia database 106 through the communication network 108, via the transceiver 216.

In an embodiment, the memory 204 may comprise a multimedia database 204a for storing one or more presentations and/or a plurality of pre-recorded multimedia files. In an embodiment, the multimedia database 204a may be integrated with the memory 204 of the electronic device 102. In another embodiment, the multimedia database 204a may be present as an external database that may be communicatively coupled to the electronic device 102, via the communication network 108. Further, in an embodiment, the I/O unit 206 may include one or more interfaces for facilitating the customization and/or rendering the customized presentations. The interfaces may include, but are not limited to, presentation content management user interface 206a, presentation review user interface 206b, and presentation sequencing user interface 206c.

In operation, the electronic device 102 may be associated two processes. In the first process, a presenter 104 may customize a presentation stored in the multimedia database 106. In the second process, the presenter 104 (or any other presenter) may play the customized presentation on the display screen 102b of the electronic device 102. The aforementioned processes have been explained in detail in the following disclosure.

As a part of the first process, the I/O unit 206 display a list of presentations for customization, to the presenter 104, via the presentation content management user interface 206a. The presenter may provide one or more gesture based inputs to select a presentation for customization. The detailed illustration of an exemplary presentation content management user interface 206a has been provided in FIG. 3A.

Subsequently, the processor 202 may receive multimedia corresponding to the presenter 104, via the transceiver 216. The processor 202 may be configured to record the received multimedia and store it in the memory 204. In an embodiment, the received multimedia may correspond to an audio associated with the presenter 104. In another embodiment, the received multimedia may correspond to an audio associated a video of the presenter 104.

The processor 202 may be configured to instruct the audio analysis unit 208 to convert the audio associated with the recorded multimedia into text. The processor 202 may include suitable logic, circuitry, interfaces, and/or code that may be configured to execute a set of instructions stored in the memory 204. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The conversion of the recorded multimedia may be based on various speech to text conversion algorithms, known in the art. Based on the speech to text conversion, the audio analysis unit 208 may be further configured to extract one or more keywords from the text of the recorded multimedia. The extracted one or more keywords may constitute repetitive information associated with the recorded multimedia. In an implementation, the audio analysis unit 208 may be based on various processor technologies known in the art.

In an embodiment, the audio analysis unit 208 may be confirmed to relay the extracted representative information to the domain reasoning unit 210. The domain reasoning unit 210 may be configured to apply natural language processing (NLP) analysis algorithms and/or topic modelling algorithms on the received representative information. Based on the NLP analysis, the extracted one or more keywords may be mapped to one or more domains that are relevant to the recorded multimedia. In an embodiment, the mapped one or more domains may also constitute the representative information associated with the recorded multimedia. In an implementation, the domain reasoning unit 210 may be based on various processor technologies known in the art.

In an embodiment, the processor 202 may be configured to receive the extracted representative information associated with the recorded multimedia, from the domain reasoning unit 210. The processor 202 may be configured to compare the representative information of the recorded multimedia with one or more tags associated with each of the plurality of pre-recorded multimedia files (representative information of the pre-recorded multimedia, hereinafter), stored in the multimedia database 204a. In an embodiment, the one or more tags may include, but are not limited to, one or more keywords and a domain of a multimedia. Based on the comparison, the processor 202 may be configured to determine one or more pre-recorded multimedia files from the multimedia database 204a.

As discussed in FIG. 1, the presentation may include a plurality of segments that may be associated with one or tags. The one or more tags may correspond to one or more keywords, or a domain relating to a segment. Such one or more tags may be referred to as representative information of the plurality of segments of the presentation, hereinafter. For example, a segment relating to introduction of a product may be tagged with the keyword "introduction". Similarly, a segment in the presentation relating to financial domain may be tagged with a domain "finance". A person of ordinary skill in the art will appreciate that in an embodiment, such tagging may be performed for the entire presentation as a whole.

The processor 202 may be configured to determine one or more segments of the presentation for customizing the presentation. In an embodiment, such a customization may be based on insertion of the determined one or more pre-recorded multimedia files into the determined one or more segments of the presentation. The determination of the one or more segments may be based on a comparison of the representative information of the recorded multimedia with one or more tags associated with each of the plurality of segments of the presentation. Furthermore, the processor 202 may be configured to compare the representative information of the pre-recorded multimedia with the representative information of the plurality of segments of the presentation. In an embodiment, the comparison of the aforementioned representative information of the recorded multimedia, the pre-recorded multimedia, and the one or more segments may be based on a machine learning analysis performed by the processor 202.

In an embodiment, based on the aforementioned comparisons of the representative information, the processor 202 may be configured to automatically insert one or more pre-recorded multimedia files into the determined one or more segments of the presentation. In another embodiment, the recorded multimedia may be inserted into the determined one or more segments of the presentation. Such an insertion may be performed based on one or more gesture based inputs provided by the presenter 104. In another embodiment, the recorded multimedia and the pre-recorded multimedia may be merged by the processor 202, based on the machine learning analysis. Further, such merged multimedia file may be inserted into the determined one or more segments of the presentation.

In an embodiment, the processor 202 may be configured to recommend the determined one or more segments to the presenter 104, for inserting the determined one or more pre-recorded multimedia files. The I/O unit 206 may be configured to display the recommendation via the presentation review user interface 206b. Based on the displayed recommendation, the presenter 104 may insert the determined pre-recorded multimedia files into the determined one or more segments of the presentation. In an embodiment, the recommendation may further include one or more options for customizing the presentation. Such one or more options may include, but are not limited to, playing a presentation, starting a recording of a multimedia associated with the presenter 104, deleting one or more segments from the presentation. The detailed illustration of an exemplary presentation review user interface 206*b* has been provided in FIG. 3B.

In an embodiment, the recommendation may further include one or more options to categorize one or more segments of the presentation into a normal section and an optional section. The normal section may include one or more segments that will be played in every iteration of presenting a presentation to an audience. In an embodiment, the one or more segments of the normal section may be skipped by the presenter 104. The optional section may include one or more segments in which the presenter 104, while presenting the presentation, may stop the presentation to provide explanation corresponding to one or more segments. A multimedia corresponding to the explanation may be recorded and inserted into the optional section of the presentation. A person of ordinary skill in the art will appreciate that while customizing the presentation, one or more recommendation may be generated to insert the multimedia inserted into the optional section into the normal section. Furthermore, a person of ordinary skill in the art will appreciate that a portion of one or more segments may be categorized into the normal section or the optional section.

In an embodiment, the categorization of the presentation into the aforementioned sections may be based on administrator rights assigned to the presenters by the processor 202. Based on the administrator rights, only the presenters having administrator rights may structure of the presentation into the aforementioned sections.

As a part of the second process, the presenter 104 may provide one or more inputs to play the customized presentation. In an embodiment, the one or more inputs may include, but are not limited to, free-form gestures, eye-based gestures, touch based gestures. In another embodiment, the inputs provided by the user may include voice commands that may be processed by the system using the audio analysis unit 208. The processor 202 may be configured to instruct the command generation unit 212 convert the detected one or more inputs into commands for playing the presentation. In an implementation, the command generation unit 212 may be based on various processor technologies known in the art.

The command generation unit 212 may retrieve a mapping of the one or more inputs and the corresponding commands, from the memory 204. Such a mapping has been depicted in Table 1.

TABLE 1

| Voice command | Gesture | Generated Command |
|---|---|---|
| Normal | wave hands from left to right | Go to a next segment in normal section |
| Optional | wave hands from right to left | Go to next segment in optional section |
| Skip | Show palm or hand | Skip a multimedia file |
| Play | Show Closed Wrist or Thumbs Up | Play a multimedia file |
| New Multimedia | Both Hands | Record a multimedia of a presenter |

As an example, corresponding to a gesture to waving hand from left to right, the command generation unit 212 may generate one or more commands to move the presentation from one segment to another. In an instance, corresponding to a gesture of showing the palm, the command generation unit 212 may generate one or more commands to skip an optional section of the presentation. In another instance, when a presenter provides commands "new multimedia", a multimedia of the presenter may be recorded and inserted into the optional section of the presentation.

Based on the aforementioned inputs and the generated one or more commands, the presentation may be played on the electronic device 102 by the multimedia player 214. In an embodiment, the multimedia player 214 may include one or more codecs, known in the art, for rendering multimedia files on an electronic device. In an embodiment, the one or more inputs may include, but are not limited to, a gesture to play the customized presentation, a gesture to skip one or more segments of the customized presentation, a gesture to start recording of a multimedia associated with the presenter. The one or more gestures may further include a gesture to insert one or more multimedia files into one or more segments of the customized presentation, a gesture to delete one or more segments from the customized presentation, and/or a gesture to delete a multimedia from the one or more segments of the customized presentation. In an implementation, the multimedia player 214 may be based on various processor technologies known in the art.

In an embodiment, the I/O unit 206 may be configured to presenting a presentation sequencing user interface 206*c* to highlight a summary of the customized presentation, while the presentation is being played. In an embodiment, the summary of the customized presentation may include one or more segments and the inserted one or more pre-recorded multimedia file, and a version history of the customized presentation. Furthermore, the I/O unit 206 may be configured to update the presentation sequencing user interface 206*c* in real-time so as to highlight a section and/or a segment that is being presented by the presenter 104. The highlighting may be based on one or more of an on screen marker, a color code, an animation, and/or a haptic feedback. In an embodiment, the I/O unit 206 may retrieve one or more commands generated by the command generation unit 212, in order to update the presentation sequencing user interface 206*c* in real-time. The mapping of the actions corresponding to command and the positioning of the marker in the presentation sequencing user interface 206*c* may be defined as depicted in Table 2 that may be stored in the memory 204.

TABLE 2

| Action corresponding to a command | Marker Positioning |
|---|---|
| Go to next segment in normal section | The marker points to the section of next multimedia in normal section |
| Go to next segment in optional section | The marker points to a multimedia of next multimedia in optional section |
| Skip the current segment | The marker points to a multimedia of next multimedia in order |
| Play the current segment | The marker points to a multimedia of next multimedia in order |
| Record the new segment | The marker points to a multimedia of next clips in order Insert the new multimedia to the current segment of a current slide and save in the multimedia database |

As an example, when a command is generated to move to a subsequent segment in the normal section, the marker may be moved to point to a multimedia that is subsequent to a currently pointed multimedia. In an instance, for a command generated to skip a section of the presentation, the I/O unit 206 may redirect the marker to a position so that it skips a section or a segment highlighted in the presentation sequencing user interface 206c. The detailed illustration of an exemplary presentation sequencing user interface has been provided in FIG. 3C.

Figure 3A:
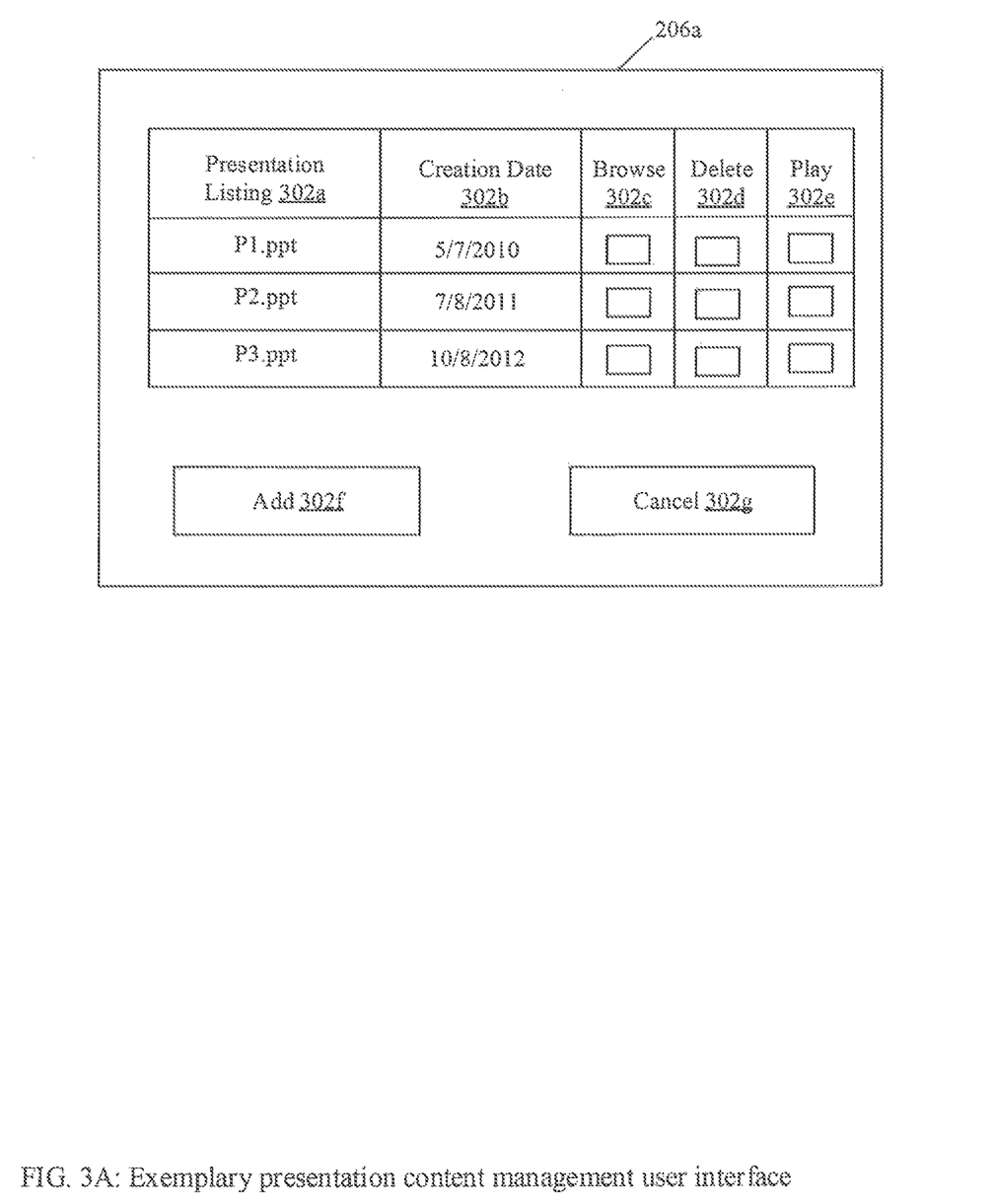
FIG. 3A illustrates an exemplary presentation content management user interface for customizing a presentation, in accordance with some embodiments of the present disclosure.

FIG. 3A illustrates an exemplary presentation content management user interface for customizing a presentation, in accordance with some embodiments of the present disclosure. The elements of FIG. 3A have been described in conjunction with elements of FIG. 1 and FIG. 2.

With reference to FIG. 3A, there is shown the presentation content management user interface 206a. The presentation content management user interface 206a includes a listing of presentations 302a that may be stored in the multimedia database 204a. The listing is displayed to the presenter 104, along with a plurality of graphical options corresponding to the presentation. In an exemplary user interface, the plurality of graphical options may include an option 302b that depicts metadata associated with a pre-stored presentation. The plurality of graphical options may further include an options 302c for browsing the multimedia database for selecting a presentation for customization. The plurality of graphical options may include an option 302d for deleting a presentation from the multimedia database 204a. The plurality of graphical options may further include an option 302e for playing a presentation.

Additionally, one or more other graphical options, such as option 302f and 302g may be presented to enable a presenter 104 to add a presentation to the multimedia database 204a or cancel an initiated customization process, respectively.

Figure 3B:
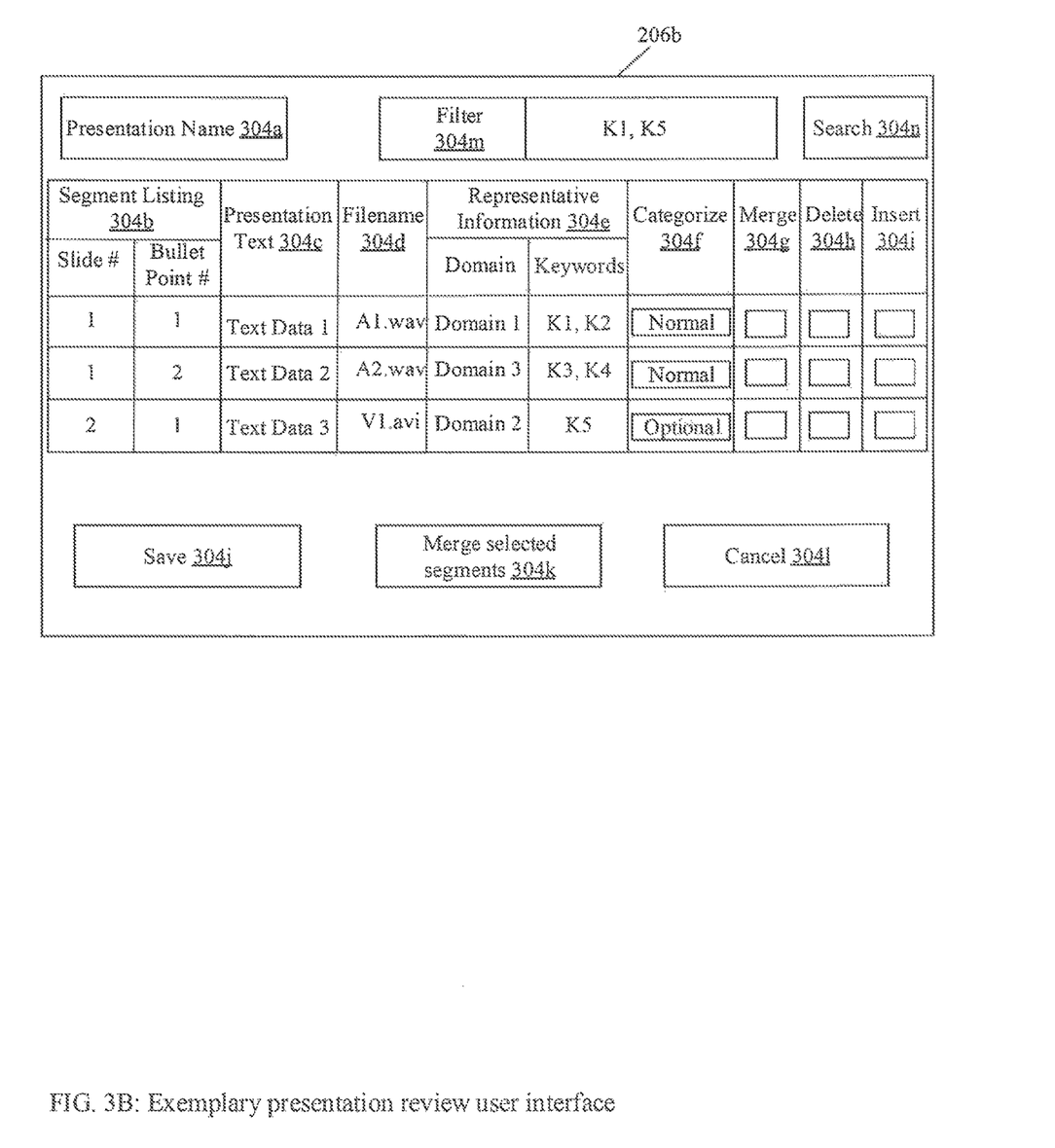
FIG. 3B illustrates an exemplary presentation review user interface for customizing a presentation, in accordance with some embodiments of the present disclosure.

FIG. 3B illustrates an exemplary presentation review user interface for customizing a presentation, in accordance with some embodiments of the present disclosure. The elements of FIG. 3B have been described in conjunction with elements of FIG. 1 and FIG. 2.

With reference to FIG. 3B, there is shown a presentation review user interface 206b. In an exemplary scenario, the presentation review user interface 206b may depict a user interface object 304a corresponding to the presentation selected for customization. The presentation review user interface 206b may further include a listing 304b of one or more segments of a presentation selected from the presentation content management user interface 206a. The one or more segments may correspond to slides and/or bullet points included in the presentation. The presentation review user interface 206b may further depict the details 304c of the one or more segments of the presentation. The details may correspond to the text of a segment (bullet point) of the presentation.

The presentation review user interface 206b may further depict a section 304d for displaying a multimedia file associated with each of the segments of the presentation. The presentation review user interface 206b may further depict metadata 304e of each of the multimedia file. In an instance of the scenario, the metadata may include a file type, such as "audio", or a "video" of the multimedia file.

The presentation review user interface 206b may further depict a section 304e for displaying representative information associated with each segment of the presentation. The representative information may comprise the domain and/or one or more keywords corresponding to a segment.

The presentation review user interface 206b may further present one or more options, such as options 304f, 304g, 304h, and/or 304i, for customizing the selected presentation. In an instance, the option 304f may facilitate categorizing the one or more segments of the presentation into normal section and optional sections. In an instance, the option 304f may correspond to button that may toggle (when pressed) from "normal section" to "optional section" and vice versa.

The option 304g may facilitate merging one or more pre-stored multimedia files with a multimedia file inserted into a segment of the presentation. The option 304h may facilitate deletion of a multimedia file inserted into a segment of the presentation. The option 304i may facilitate insertion of one or more pre-stored multimedia files into a segment of the presentation.

Additionally, the presentation review user interface 206b may further present one or more options, such as options 304j, 304k, and/or 304l, for saving the changes made to the presentation, merging multimedia of one or more segments, and/or cancelling the customization of the presentation, respectively. In an instance, the presentation review user interface 206b may further include a user interface object corresponding to a filter 304m. Based on such filter relevant multimedia may be displayed corresponding to a match between input filter text and representative information. In an instance, the input filter text may be based on one or keywords, such as the keywords "K1" and "K5", provided by the presenter. The comparison of the input filter text with the representative information may be performed when the user interface object 304n corresponding to the search is selected by the presenter.

Figure 3C:
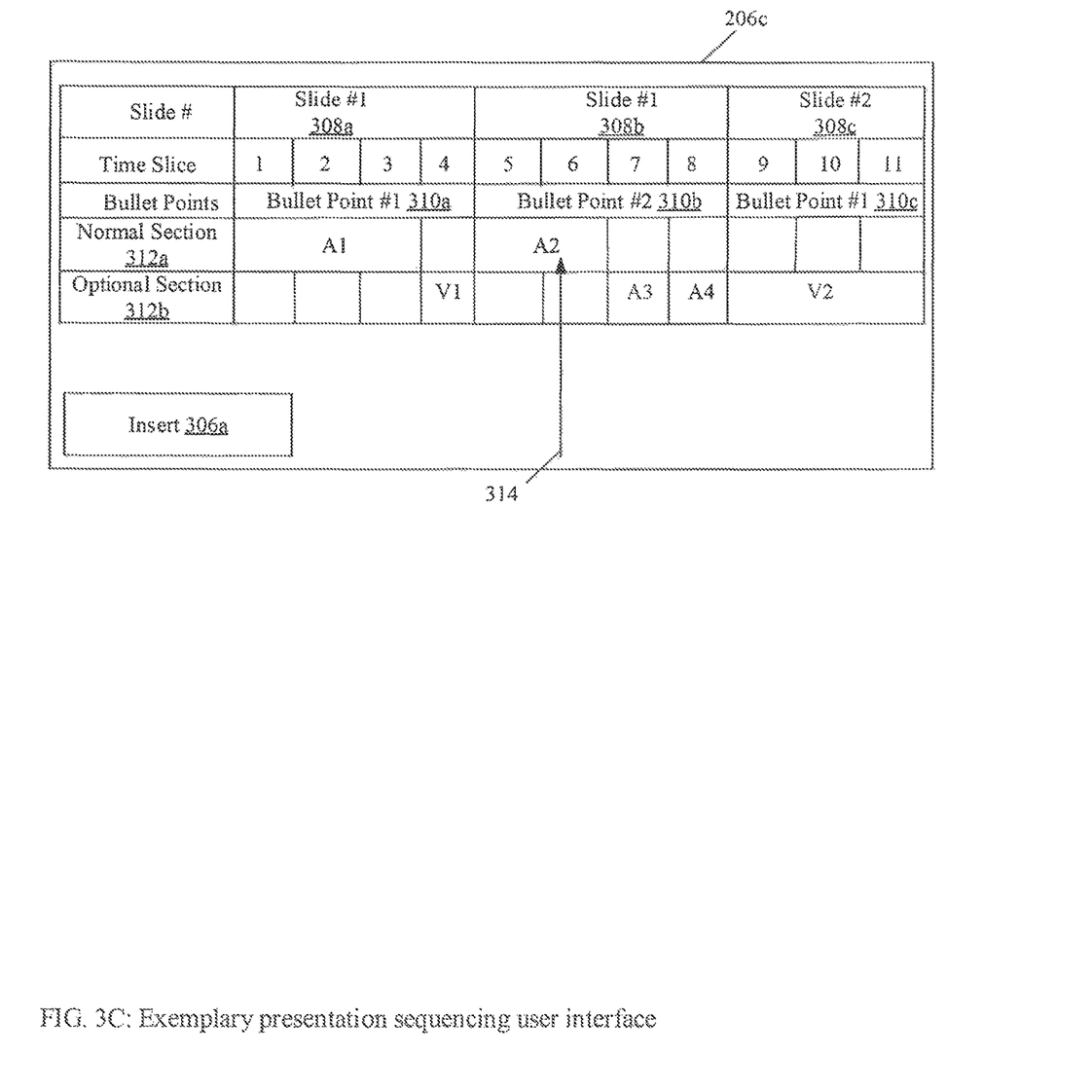
FIG. 3C illustrates an exemplary presentation sequencing user interface for customizing a presentation, in accordance with some embodiments of the present disclosure.

FIG. 3C illustrates an exemplary presentation sequencing user interface for customizing a presentation, in accordance with some embodiments of the present disclosure. The elements of FIG. 3C have been described in conjunction with elements of FIG. 1 and FIG. 2.

With reference to FIG. 3C, there is shown a presentation sequencing user interface 206c. The user interface may include an option 306a to insert a customized presentation into the sequencer. Such an insertion may be performed for highlighting a summary of the customized presentation, while the presentation is being played.

In an exemplary scenario, the presentation sequencing interface 206c may include timeline divided into a plurality of first slots, 308a, 308b, and/or 308c. Each of the first slot may correspond to a slide of the customized presentation. The timeline may be further divided into a plurality of second slots, 310a, 310b, and/or 310c. Each of the second slot may correspond to a segment (or a bullet point) of the customized presentation. In an instance, the slot 310a may correspond to "Bullet Point #1" of a "Slide #1" the customized presentation, the slot 310b may correspond to "Bullet Point #2" of the "Slide #1" of the customized presentation, and the slot 310c may correspond to "Bullet Point #1" of the "Slide #2" of the customized presentation. Furthermore, a slot of a segment may be divided into time slice. In an instance, the duration of the time slice may be "1 minute".

The presentation sequencing user interface 206c may further separately display the normal section 312a and the optional section 312b of the customized presentation. As explained in FIG. 2, the normal section may include the portion of the customized presentation that will be played each time the presentation is played. However, the one or more segments of the normal section may be skipped by the presenter 104 based on one or more gestures.

The optional section corresponds to the section of the customized presentation in which, the presenter 104, while presenting the presentation, may stop the presentation to provide explanation corresponding to one or more segments. A multimedia corresponding to the explanation may be recorded and inserted into the optional section of the presentation. The presentation sequencing user interface 206c may further display one or more multimedia files that may be inserted into the customized presentation. Further, each of the displayed multimedia is displayed with reference to a segment of the customized presentation and the time slice required for playing the multimedia file. For example, the multimedia file "A1" is inserted into the "Slide #1" and a first portion of the "Bullet Point #1" of the customized presentation. The duration of the first portion corresponding to the inserted multimedia file "A1" is "3" time slices. Furthermore, because the multimedia file "A1" is a part of the normal section 312a of the presentation, it will not be skipped while playback of the customized presentation, unless one or more gestures corresponding to skipping the section are received from the presenter 104. Similarly, the multimedia file "V1" may be inserted into the optional section 312b of the "Slide #1" and a second portion of the "Bullet Point #1". The duration of the second portion corresponding to the inserted multimedia file "V1" is "1" time slice. In an instance, the multimedia file "V1" may correspond to an explanation provided by the presenter 104. The multimedia file "V1" may be provided by the presenter 104 by using the gesture of showing both hands (as disclosed in Table 2). Based on such a gesture, the electronic device 102 may record the multimedia and insert it into the optional segment 312b of the "Bullet point #1". As explained in FIG. 2, the multimedia corresponding to the optional section 312b may be merged with the multimedia of the normal section 312a, while the presenter is customizing the presentation at a later stage. Such a merging may be performed by using the presentation review user interface 206b.

Additionally, the presentation sequencing user interface 206c may display a real-time status of the playback of the customized presentation based on a marker 314. In an instance of the exemplary scenario, the position of the marker may be dynamically updated based on the segment (or bullet point) presented by the presented at a particular instance of time.

Figure 4:
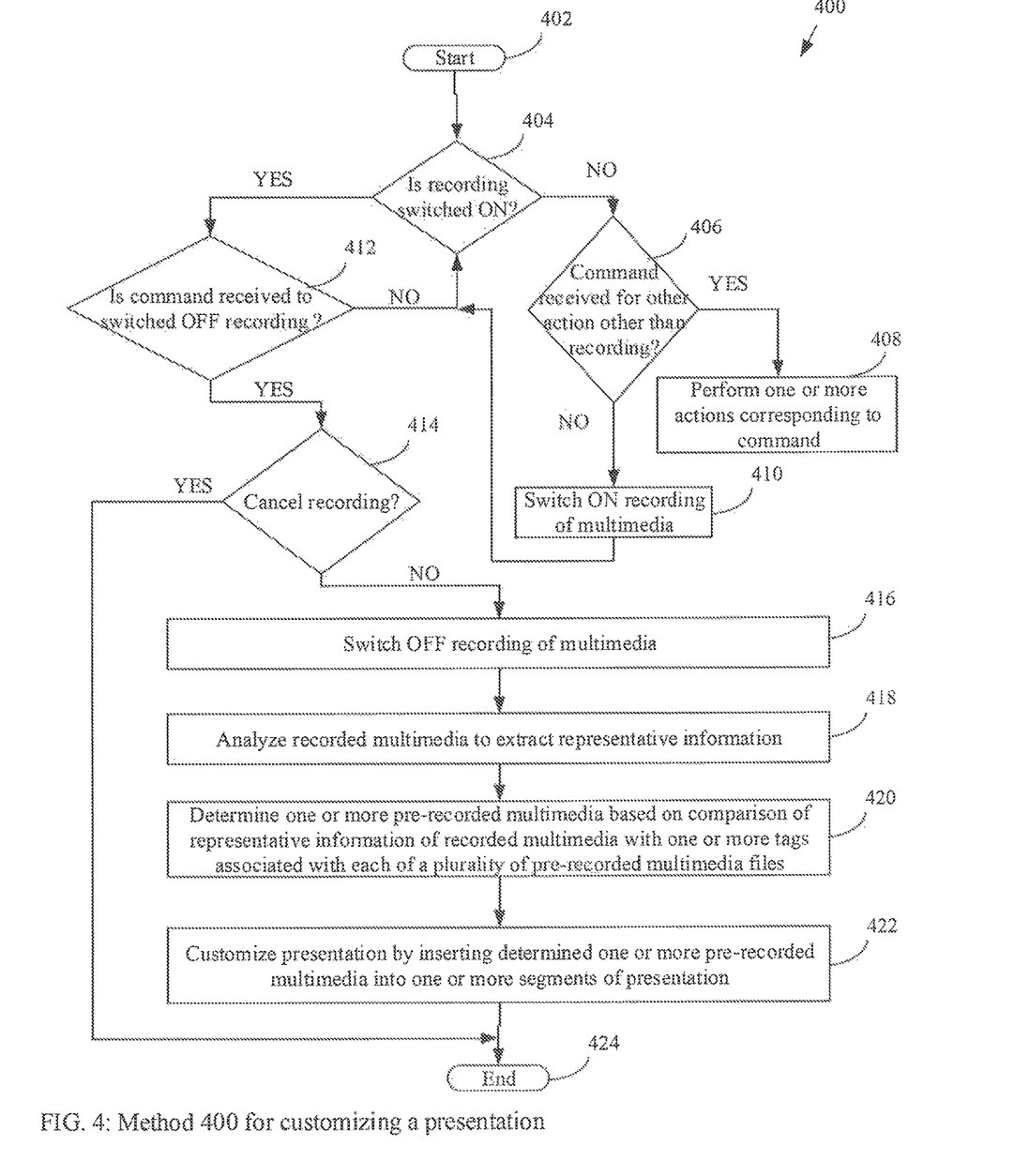
FIG. 4 is a flow diagram of a detailed exemplary process for customizing a presentation, in accordance with some embodiments of the present disclosure.

FIG. 4 is a flow diagram of a detailed exemplary process for customizing a presentation, in accordance with some embodiments of the present disclosure. With reference to FIG. 4, there is shown a flow chart 400. The flow chart 400 is described in conjunction with FIGS. 1 to 3C. The process starts at step 402 and proceeds to step 404.

At step 404, it may be determined whether recording of multimedia by the electronic device 102 is switched ON. In instances when the determination at step 404 is negative, the control passes to step 406. At step 406, it may be determined whether a command is received from the presenter to perform an action other than switching ON the recording. In an embodiment, such actions may comprise customizing the presentation based on insertion, deletion, merging, etc. of the multimedia files in the presentation. In instances, when the determination of step 406 is positive, the action corresponding to the command of the presenter 104 is performed by the electronic device 102, at step 408. In instances, when the determination of step 406 is negative, the control passes to the step 410. At step 410, the recording of multimedia by the electronic device 102 may be switched ON by the electronic device 102.

In instances when the determination at step 404 is positive, it may be determined, at step 412, whether a command to switch OFF the recording of multimedia file associated with the presenter, is received by the electronic device 102. In instance when the determination at step 412 is negative, it may be determined, at step 414, whether the presenter intends to cancel the recording. In instances when the determination at step 414 is positive, the control passes to step 424. In instances when the determination at step 414 is negative, the control passes to the step 416. At step 416, a command is generated by the electronic device 102 to switch OFF the recording of the multimedia of the presenter 104.

At step 418, the recorded multimedia may be analyzed by the audio analysis unit 208 to extract representative information corresponding to the multimedia. At step 420, one or more pre-recorded multimedia files may be determined by the domain reasoning unit 210 of the electronic device 102, from a plurality of pre-recorded multimedia files stored in the multimedia database 204a. The determination may be based on a comparison of representative information with one or more tags associated with each of a plurality of pre-recorded multimedia files. At step 422, the presentation may be customized by the domain reasoning unit 210 of the electronic device 102, by inserting the determined one or more pre-recorded multimedia files in the presentation. The control passes to end step 424.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
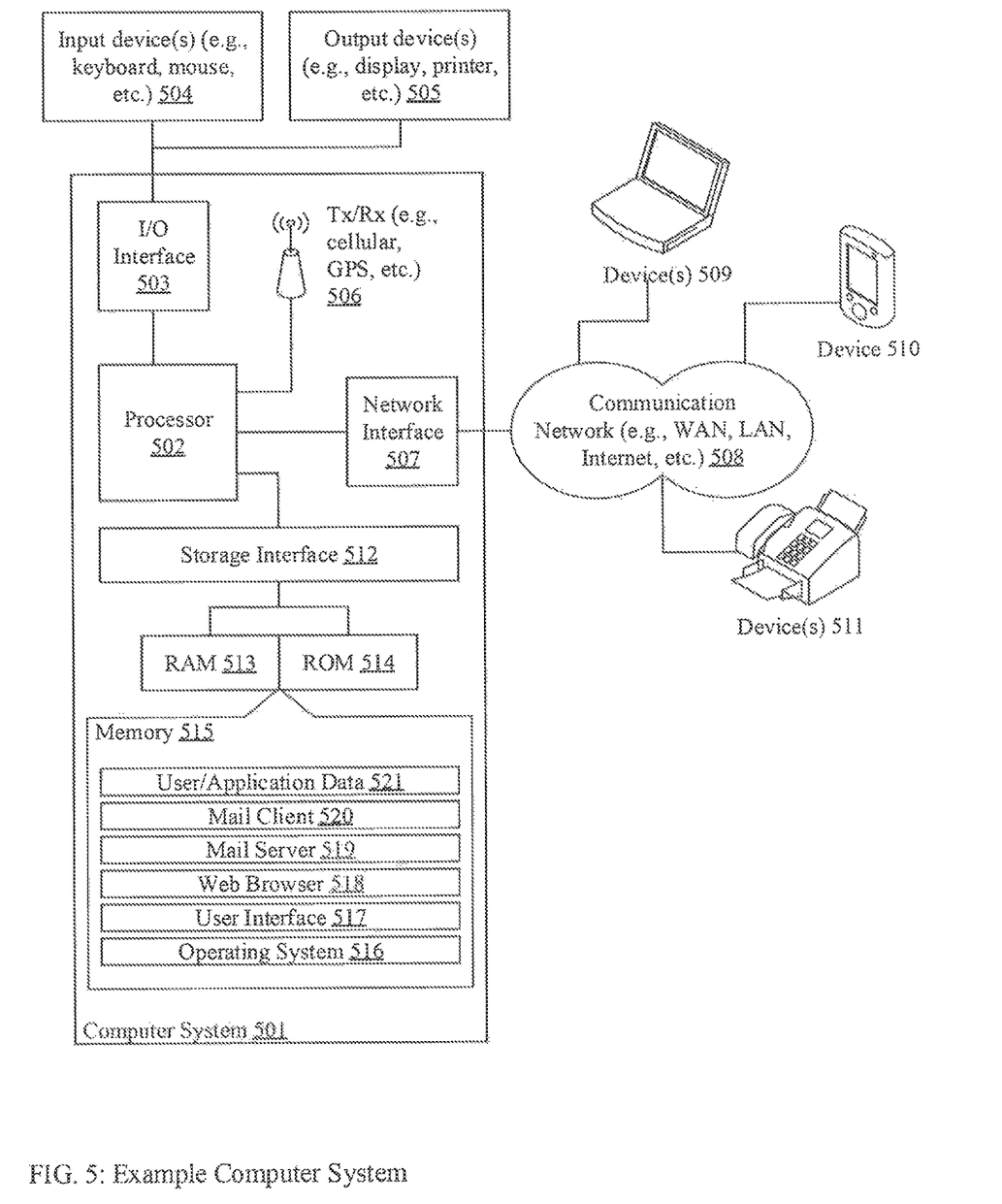
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing network environment 100 for transmitting data over a communication network. Computer system 501 may include a central processing unit ("CPU" or "processor") 502. Processor 502 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C #, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., past ticket repository, keywords, Ngrams, clusters or categories, relationship mapping, user queries, resolutions, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for customizing a presentation, thereby enabling a presenter to customize a presentation using pre-recorded multimedia. The aforementioned customization may be performed in real-time by the presenter, as the system enables searching of historically saved multimedia files and dynamic insertion of the relevant multimedia files into the relevant segments of the presentation. Furthermore, the system also equips the user to keep a track of the changes made to the presentation by other presenters and incorporate such changes in the current version. Additionally, the system also enables a presenter to structure the presentation into normal section and an optional section. Based on such a structuring, the presenter may dynamically decide to skip certain portions of the presentation.

In another aspect of the invention, the system enables a presenter to keep a track of the presentation during playback, via a user interface. The user interface also presents a summary of the presentation to the presenter. Based on the information presented on the user interface, the presenter may be better equipped to dynamically decide whether a segment of the presentation is to be skipped while presenting.

The specification has described system and method for adapting a display on an electronic device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of customizing a presentation, the method comprising:
   recording, by a recording unit, multimedia comprising at least one of a video or an audio of a presenter presenting the presentation to obtain a recorded multimedia;
   extracting, from the multimedia, representative information corresponding to the multimedia;
   determining, by a domain reasoning unit, one or more pre-recorded multimedia files from a multimedia database, by comparing the representative information with one or more tags associated with each of a plurality of pre-recorded multimedia files;
   determining, by the domain reasoning unit, one or more segments of the presentation for inserting at least one of the recorded multimedia or the one or more pre-recorded multimedia files, by comparing the representative information with one or more tags associated with each of the one or more segments of the presentation, wherein each of the one or more segments corresponds to a slot of a plurality of slots of a timeline of the presentation;
   categorizing, by the domain reasoning unit, at least a portion of the one or more segments into one of a normal section and an optional section of the presentation based on a user input; and
   customizing the presentation, by the domain reasoning unit, by inserting at least one of the recorded multimedia or the one or more pre-recorded multimedia files into one of the normal section and the optional section of the presentation to generate a customized presentation, wherein the customizing comprises:
      dynamically deciding whether to skip one or more portions of the presentation while presenting,
   wherein the normal section of the presentation comprises at least a portion of the presentation that is played mandatorily during presenting of the presentation, and wherein the optional section comprises at least a portion of the customized presentation that is stoppable during presenting of the presentation.

2. The method of claim 1, wherein the representative information corresponding to the multimedia, and the one or more tags associated with each of the plurality of pre-recorded multimedia files comprise at least one of a domain of the multimedia or one or more keywords.

3. The method of claim 1, wherein the determination of the one or more segments of the presentation is based on a machine learning analysis performed on at least one of the representative information, the one or more tags associated with each of a plurality of pre-recorded multimedia files, or the one or more tags associated with each of the one or more segments of the presentation.

4. The method of claim 1, further comprising recommending, to the presenter, the determined one or more pre-recorded multimedia files for insertion into the one or more segments of the presentation.

5. The method of claim 4, wherein the recommendation is based on a comparison of the representative information with the one or more tags associated with each of the plurality of pre-recorded multimedia files.

6. The method of claim 1, further comprising rendering the customized presentation based on one or more gestures of the presenter.

7. The method of claim 6, wherein the one or more gestures comprises gestures to at least one of play the customized presentation, skip the one or more segments of the customized presentation, start recording of the multimedia associated with the presenter, insert one or more recorded multimedia files into the one or more segments of the customized presentation, delete the one or more segments from the customized presentation or delete the multimedia from the one or more segments of the presentation.

8. The method of claim 1, further comprising presenting a user interface to highlight a summary of the customized presentation, wherein the summary comprises at least one of the inserted one or more pre-recorded multimedia files, the one or more segments of the presentation, or a version history of the customized presentation.

9. The method of claim 8, wherein the user interface comprises a real-time status of rendering the customized presentation, and wherein the real-time status is highlighted based on a marker.

10. A system for customizing a presentation, the system comprising:
    a processor; and
    a memory communicatively coupled to the processor, wherein the memory stores the processor-executable instructions, which, on execution, causes the processor to:
        record multimedia comprising at least one of a video or an audio of a presenter presenting the presentation to obtain a recorded multimedia;
        extract representative information corresponding to the multimedia;
        determine one or more pre-recorded multimedia files from a multimedia database by comparing the representative information with one or more tags associated with each of a plurality of pre-recorded multimedia files;
        determine one or more segments of the presentation for inserting at least one of the recorded multimedia or the one or more pre-recorded multimedia files by comparing the representative information with one or more tags associated with each of the one or more segments of the presentation, wherein each of the one or more segments corresponds to a slot of a plurality of slots of a timeline of the presentation;
        categorize at least a portion of the one or more segments into one of a normal section and an optional section of the presentation based on a user input; and
        customize the presentation by inserting at least one of the recorded multimedia or the one or more pre-recorded multimedia files into one of the normal section and the optional section of the presentation to generate a customized presentation, wherein the customizing comprises:
            dynamically deciding whether to skip one or more portions of the presentation while presenting,
        wherein the normal section of the presentation comprises at least a portion of the presentation that is played mandatorily during presenting of the presentation, and wherein the optional section comprises at least a portion of the customized presentation that is stoppable during presenting of the presentation.

11. The system of claim 10, wherein the processor is further configured to recommend, to the presenter, the determined one or more pre-recorded multimedia files for insertion into the one or more segments of the presentation, and wherein the recommendation is based on a comparison of the representative information with the one or more tags associated with each of the plurality of pre-recorded multimedia files.

12. The system of claim 10, wherein the processor is further configured to render the customized presentation based on one or more gestures of the presenter.

13. The system of claim 12, wherein the one or more gestures comprise gestures to at least one of play the customized presentation, skip the one or more segments of the customized presentation, start recording of the multimedia associated with the presenter, insert one or more recorded multimedia files into the one or more segments of the customized presentation, delete the one or more segments from the customized presentation or delete the multimedia from the one or more segments of the presentation.

14. The system of claim 10, wherein the processor is further configured to present a user interface to highlight a summary of the customized presentation, wherein the summary comprises at least one of the inserted one or more pre-recorded multimedia files, the one or more segments of the presentation, or a version history of the customized presentation.

15. The system of claim 14, wherein the user interface comprises a real-time status of rendering the customized presentation, and wherein the real-time status is highlighted based on a marker.

16. A non-transitory computer-readable medium storing instructions for customizing a presentation, wherein upon execution of the instructions by one or more processors, the one or more processors perform operations comprising:
    recording multimedia comprising at least one of a video or an audio of a presenter presenting the presentation to obtain a recorded multimedia;
    extracting, from the multimedia, representative information corresponding to the multimedia;
    determining one or more pre-recorded multimedia files from a multimedia database, by comparing the representative information with one or more tags associated with each of a plurality of pre-recorded multimedia files;
    determining one or more segments of the presentation for inserting at least one of the recorded multimedia or the one or more pre-recorded multimedia files by comparing the representative information with one or more tags associated with each of the one or more segments of the presentation, wherein each of the one or more segments corresponds to a slot of a plurality of slots of a timeline of the presentation;
    categorizing at least a portion of the one or more segments into one of a normal section and an optional section of the presentation based on a user input; and
    customizing the presentation by inserting at least one of the recorded multimedia or the one or more pre-recorded multimedia files into one of the normal section and the optional section of the presentation to generate a customized presentation, wherein the customizing comprises:
        dynamically deciding whether to skip one or more portions of the presentation while presenting,
    wherein the normal section of the presentation comprises at least a portion of the presentation that is played mandatorily during presenting of the presentation, and wherein the optional section comprises at least a portion of the customized presentation that is stoppable during presenting of the presentation.

* * * * *